Patented Apr. 29, 1952

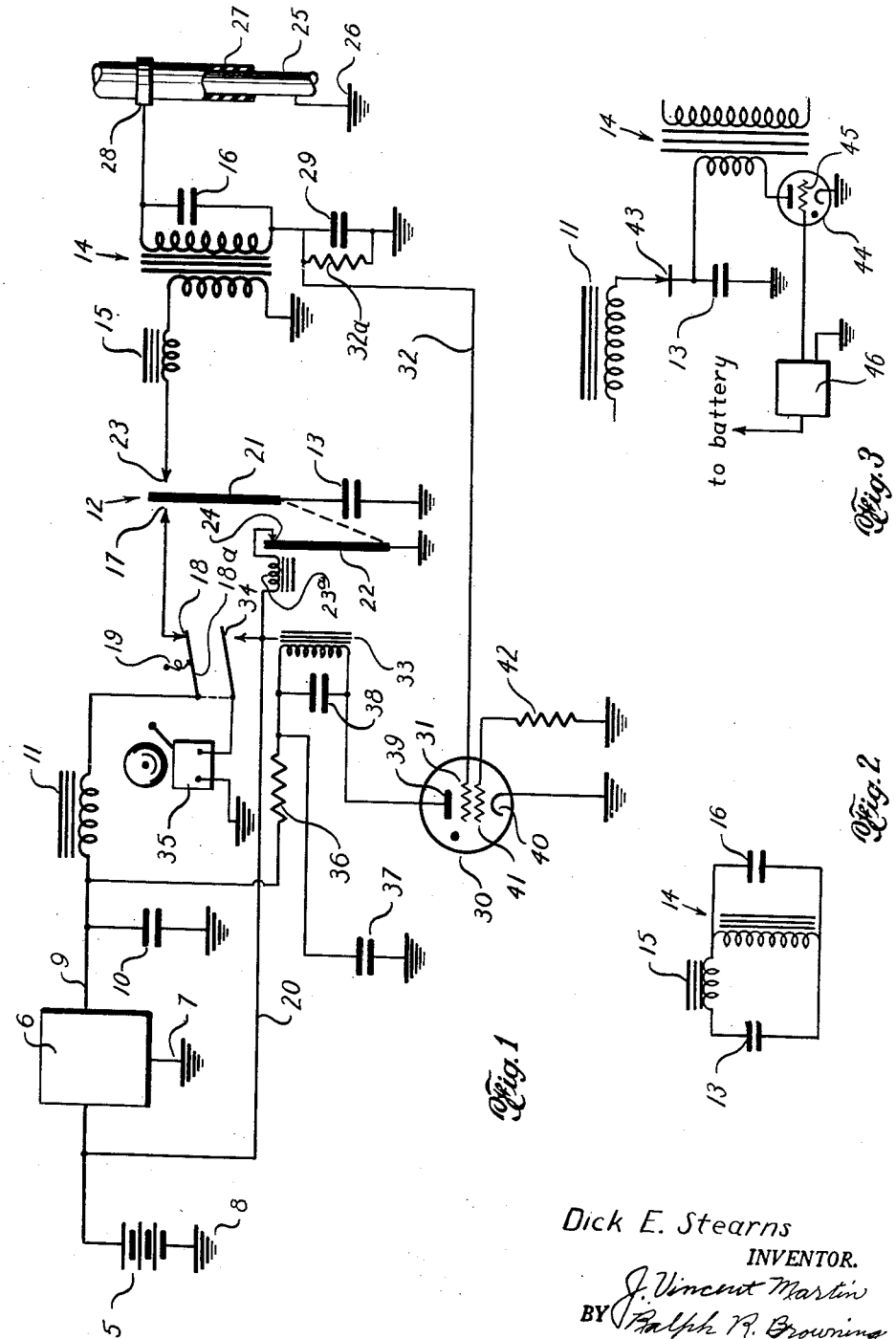

2,594,595

UNITED STATES PATENT OFFICE 2,594,595

SURGE GENERATOR

Dick E. Stearns, Shreveport, La.

Application January 5, 1948, Serial No. 527

8 Claims. (Cl. 175—373)

This invention relates to improvements in generators for portable, insulation testing apparatus, and refers more particularly to surge generators adapted to efficiently provide surge impulses having well regulated voltage characteristics throughout a wide load range.

This application is a continuation in part of my copending application, Serial No. 493,514, filed July 5, 1943, now Patent No. 2,436,615.

In portable installations such as those used for instance, in cross-country testing of insulation bonded to pipe lines for conducting fluids such as petroleum products, water and the like, it has become the practice to search out flaws in the insulation material by subjecting the material to high voltage. The entire surface area of the pipe line must be tested, and in performing this work, the size and compactness of the test equipment becomes an important factor. Toward this end, it is desirable that the testing device utilize a minimum of power to reduce the size of the storage battery required.

In testing devices of this character, the size of the pipe to be tested by a given machine will often vary even in a single pipe line. It is believed obvious that different diameter pipe lines will present different load factors to the test apparatus. In order that the apparatus may be used upon pipe lines of different diameters, it is desirable that the output or test voltage will remain substantially constant or well regulated throughout a large range of load conditions.

An object of this invention is to provide a compact surge generator which lends itself to assembly in a small light-weight inspection unit.

Another object is to provide a surge generator capable of efficiently utilizing a portable source of electrical energy.

A further object is to provide a means for charging an energy storing condenser in a highly efficient manner from a source of direct current potential.

Still another object is to provide a surge generator, the output of which is well regulated with respect to a wide range of load conditions.

Other and further objects of this invention will appear from the description of the embodiment of the invention shown in the drawings.

In the accompanying drawings which form a part of the instant specification, which are to be read in conjunction therewith and wherein like reference numerals are used to indicate like parts in the various views:

Fig. 1 is an illustration of the circuit of a surge generator embodying this invention, shown in conjunction with pipe insulation testing apparatus;

Fig. 2 is an equivalent circuit of the transformer and associated parts of the oscillatory circuit of the surge generator shown in Fig. 1 and is included for the purpose of illustrating the mode of operation of this portion of the surge generator; and Fig. 3 is a view illustrating a modified surge generator embodying this invention.

To facilitate reading of the detailed description which will follow, this apparatus, in general, may be considered as including several separate circuits. One circuit includes the elements to provide a source of low impedance, direct electric potential, and will be referred to as the power source. The power source is connected to and energizes the surge generator circuit for producing the test voltage to be applied to the insulation. The testing circuit is connected across the surge generator output and includes an exploring electrode, which is movable over the surface of the material to be tested. The pipe line which carries the insulation is of electrically conductive material and provides the other terminal for the testing circuit. The detector circuit is arranged to respond to a sharp increase in the current flow within the inspection circuit. The detector circuit contains a detector tube which receives its operating voltage from the power source. The detection circuit is arranged to operate a relay which is effective to disconnect the power source from the surge generator when a flaw is encountered in the insulation material under test, and to simultaneously give notice of the flaw to the operator of the equipment.

Referring to the drawings, more particularly Fig. 1, numeral 5 designates a source of direct current energy such as a storage battery. The positive terminal of the battery is connected into a conventional vibratory power converter 6. Both the input and output circuits of the power converter have a common ground 7. The negative terminal of the battery 5 is grounded at 8. The positive output terminal of the power converter is connected by conductor 9 to a condenser 10, having one plate grounded. The condenser serves as a filter to smooth the voltage output from the power converter. This condenser also serves to provide a low impedance source of output voltage to energize the surge generator circuit to be hereinafter described.

Referring to the surge generator circuit, it is made up of several component parts: namely, an inductance 11, a current interrupter 12, a condenser 13, a transformer 14, an inductance 15 and a condenser 16. Condenser 13 is utilized to accumulate a charge which is then switched into the primary winding or coil of transformer 14. In order to charge the condenser 13 in an efficient manner, this condenser is included in a voltage doubler circuit. This voltage doubler includes condenser 13, having one plate grounded, and its other plate connectable through contact 17 of current interrupter 12 to inductance 11. Switch 18, which is included in this circuit, is normally held closed by spring 19, and for purposes of explaining the hook up and function of the doubler circuit will be considered as closed. The current interrupter 12 is utilized as a rectifier in the doubler circuit. Movable contact 21 of the interrupter is controlled by a mechanical linkage to vibrating reed 22. The energization of reed 22 is provided by the electromagnet 23a actuated through contact 24. The arrangement of the component parts of the vibrator is such as to result in a sustained vibration, with the system being energized from primary power source 5 through conductor 20. Reed 22, in its rest position, makes contact at 24. The reed 22 is weighted so that it will vibrate at a predetermined frequency. The frequency is selected to bring movable contact 21 into engagement with fixed contact 17 and to maintain this contact for a selected period of time sufficient to permit an accumulation of a maximum charge upon condenser 13. At this instant the contact must be broken in order to prevent discharge of the condenser back through the power source. The importance of this will be more fully developed in the following paragraph.

The doubler effect is brought about by the function of inductance 11. Contact 17 of the vibrator 12 makes connection with the movable contact 21 at a time when there is zero charge on the condenser 13. Immediately a current starts to flow through the inductance 11, through the relay contact 18 through the contact 17 into the condenser 13. The magnitude of the current rises continuously until the voltage on the condenser 13 is equal to the voltage on the condenser 10. Simultaneously with this charging of condenser 13 magnetic energy is stored in the inductance 11. When the voltages on condensers 10 and 13 are equal, the energy contents of inductance 11 and condenser 13 are equal. The energy content of the inductance is discharged in the way of a continued flow of current to the condenser 13 until all of the stored energy of the inductance has been transferred into condenser 13. At the time when this energy transfer has been completed, the movable contact 21 breaks from fixed contact 17, so as to leave a maximum charge on condenser 13. In a circuit in which there were no losses, the final voltage charge on condenser 13 would be exactly double that present on condenser 10 in the power source. The result of the moving contact 21 breaking from the contact 17 at this instant prevents back flow of the charge from condenser 13 to the power source, and thus the vibratory reed, movable contact 21 and contact 17 is a rectifier by the nature of its function.

The frequency of reed 22 is selected so as to provide engagement of contacts 21 and 17 for exactly the correct time period to permit the accumulation of a maximum charge upon condenser 13.

The action above described results in transfer of energy from the power source to the condenser with a theoretical efficiency of 100% and a practically obtained efficiency closely approaching this. This contrasts sharply with the limiting efficiency of 50% which is obtainable by the conventional systems used to charge a condenser from a D. C. source. This circuit, therefore, obviously is of advantage in the interest of conservation of energy.

This accumulated charge upon condenser 13, after separation of contacts 21 and 17, is maintained at this maximum value until this condenser is again thrown into a complete circuit. This charge is now available for energizing transformer 14 and, in accordance with the invention, is utilized to generate the oscillatory surge which is used in the load or test circuit.

The primary winding or coil of transformer 14 is connected in series with the inductance 15 between the ground and fixed contact 23 engageable by movable contact 21. This provides a means for intermittently connecting the primary coil of the transformer across condenser 13.

Upon engagement of contacts 21 and 23, the charged condenser 13 will discharge its energy through the primary coil of the transformer, and, due to the turns ratio of the transformer, a high voltage is generated in the secondary of the transformer which charges the condenser 16, connected across the secondary coil. The voltage across condenser 16 is that which is utilized in the inspection of load circuit, which is connectable across the condenser.

By reference to the drawings, it will be seen that condensers 13 and 16, together with inductance 15 and transformer 14, provide a circuit in which several modes of oscillation are possible. By control of the balance of values in these components, the characteristics of the desired oscillatory surge may be regulated.

By referring to Fig. 2, the simplified electrical equivalent of the circuit between condenser 13 and condenser 16 is shown. Three modes of oscillation are possible, as is apparent from the figure. The mode of oscillation which is utilized in this invention is that which occurs through the circuit, including condenser 13, condenser 16 and inductance 15. The transformer 14 serves only as a coupling which makes possible a step-up of the output voltage.

By comparing the theoretical equivalent circuit with the actual circuit, it will be seen that the oscillatory surge as actually generated oscillates through condensers 13 and 16, due to the presence of inductance 15, as though the condensers and inductance were series connected.

The inductance value in the primary of the transformer 14 must be of considerably greater value than that designed into the inductance 15 in order to make the oscillation occurring through this portion of the circuit of low frequency. Thus the transformer 14 acts only as a coupling between the primary and the secondary coils.

One of the chief advantages of this surge generator system is its low power loss as compared to conventional systems for generating high voltage surges. The conventional system includes a step up transformer with a condenser connected across its primary coil. These are connected in parallel with a D. C. energy source, the connection having an interrupter therein to periodically disconnect the power source from the transformer and condenser. In operation the voltage developed in the secondary of the transformer is in direct proportion to the rate of change of the magnetic field. This field is dependent upon the current flow in the primary of the transformer.

Upon completion of the circuit with the power source, current flows through the primary coil directly from the energy source, magnetic energy is stored therein and the condenser is simultaneously charged. Upon interruption of the flow of current from the source, an oscillation sets up supported by the condenser and the reactance of the primary coil. This oscillation has an exponential decay. Thus it is seen that there is a continuous flow of current through the primary and this means a continuous power loss equal in watts to the square of the current multiplied by the resistance of the circuit.

In contrast with this continuous power loss applicant's generator involves only intermittent power losses, due to the primary circuit, because the primary coil is not connected across the condenser while it is being charged. The charged condenser is solely relied upon to energize the transformer. Upon connection of the charged condenser across the primary of the transformer the magnetic field thereof rapidly rises to develop the desired output voltage in the secondary of the transformer. Here again, the condenser in parallel with the primary reactance of the transformer supports an oscillation with an exponential decay.

In order to attain the highest possible efficiency of the high voltage transformer, it is desirable to keep the turns ratio as low as is practicable, thus minimizing the effect of the reflected load of the secondary in the primary. The load, as affecting the primary of the transformer, is equal to the actual load presented across the secondary of the transformer, multiplied by the square of the turns ratio of the transformer. For this reason, the lowest possible turns ratio in the transformer will result in a minimum loading of the primary of the transformer, which further results in a low power demand by the transformer. Where the load consists only of a resistance across the secondary of the transformer, the turns ratio of the transformer is fixed by the desired output voltage. However, where the load is also capacitative, as in insulation testing apparatus, the turns ratio necessary to attain a desired output voltage becomes a function of the value of the capacitative load, the value of the energy storing capacitor in the primary circuit, and of the series inductance 15. The necessary turns ratio can be minimized by using the correct value of inductance 15.

The load connected across condenser 16 is by nature a condenser. This characteristic of the load circuit requires the utilization of the condenser 16 in the surge generator to level out the percentage capacitance variations in the loading which wil be encountered in testing operation.

By utilizing this circuit, the desired out-put oscillatory surge will have a greater voltage, as well as better regulation, than if the same components of the circuit are used except for the omission of inductance 15. By regulation it is meant that the out-put voltage magnitude will remain substantially constant over a wide range of load variations. It is then apparent that, to obtain an oscillatory surge of a predetermined voltage, a transformer having a lesser turns ratio may be employed. This reduction of the turns ratio requirement saves power, cost of equipment and size of equipment. Of course to obtain this regulation the condenser 13 must be completely discharged each time contact 21 engages contact 23 and this means that the oscillatory surge must be of short duration damping out before the contact 21 leaves contact 23. Thus the charge on condenser 13 will be zero and on remaking of contacts 17 and 21 the charge on condenser 13 will build to the same constant maximum.

Attention will now be directed to the inspection circuit or the load circuit shown in the drawings. A segment of a pipe line is shown at 25, which is made of conducting material and grounded at 26. The pipe has a covering of insulation material 27, the exterior of which is subjected to the test voltage from condenser 16 by means of an exploring electrode 28. When the exploring electrode 28 encounters a flaw, defect or holiday in the insulation material under test, a spark results between the exploring electrode and the pipe line, caused by the discharge of condenser 16.

Referring now to the detection circuit, condenser 29 serves to by-pass the normal current flow through exploring electrode 28. A breakdown in the insulating material causes a surge of current therepast which goes to the ground at point 26 and returns through the ground and condenser 29 to the condenser 16. The current surge is a result of the discharge of energy from the condenser 16. The current charges condenser 29, which has an operable connection with the detector circuit. Voltage breakdown will always occur only on the first peak of the oscillatory surge, since, if the insulation on the pipe is sufficient to withstand this highest peak voltage, it will certainly withstand the lesser voltage peaks which follow. The first peak of the oscillatory surge is always in the same direction. Thus the discharge of condenser 16 will result in a charge upon condenser 29 that is always in the same direction. The D. C. voltage upon condenser 29 is utilized to actuate the detector circuit.

The detector circuit employed includes a gaseous discharge or detector tube 30, having its grid 31 connected to the condenser 29 by conductor 32. Resistance 32a discharges condenser 29 at a predetermined rate to limit the time period of each energization of grid 31, whereby the grid serves only to trigger the tube. This mounting of condenser 29 is preferred over the connection shown in my prior Patent No. 2,436,615 hereinbefore mentioned because it eliminates the possibility of improper installation in the field and thereby assures proper actuation of the detector circuit and its component signal devices.

The flow of current through the plate circuit of detector tube 30, upon energization of the tube, is relied upon to sound an alarm and to break the surge generator circuit. This is accomplished by means of a relay, including coil 33, operative upon energization to close movable contact 34, mechanically linked with movable contact 18a, to complete the circuit, including bell 35 through conductor 20 to battery and also to break contact 18, and thus discontinue the transfer of power to the surge generator.

The detector tube and relay are included in a circuit designed to render the gas tube non-conductive after a short but finite period of ionization and to maintain the relay closed for an additional finite period. In order to accomplish this the plate circuit may be connected with the power converter 6 through a conductor, including a resistance 36, which permits a slow accumulation of a charge upon condenser 37. However, resistance 36 does not permit a sufficient rate of current flow therethrough to maintain by itself, ionization of the gas within the tube 30.

The plate circuit, including plate 39 and the grounded cathode 40 of the tube, includes relay coil 33 and also condenser 38. When the control grid 31 is energized, by a charge upon condenser 29, the gas tube is rendered conductive, and the discharge of the accumulated energy from condenser 37 charges condenser 38 and energizes relay coil 33 to close the alarm circuit and open the generator circuit. The charge upon condenser 37 is quickly dissipated through the plate circuit and falls below that quantity which, when taken together with the flow through resister 36, is requisite to maintain ionization of the gas tube. Upon the discharge of condenser 37, condenser 38 discharges through coil 33 to maintain the relay position for an additional finite time.

In the embodiment illustrated, detector tube 30 is a dual grid tube, grid 41 being grounded through a resister 42. By use of this type tube a heated filament is dispensed with, further simplifying the installation.

Referirng to the modification of Fig. 3, the modified circuit includes inductance 11, transformer 14 and condenser 13. However, the interrupting means shown in Fig. 1 for alternatively connecting the inductance 11 and transformer across condenser 13 has been replaced by a current rectifier 43 of more usual form and a gas tube 44. Otherwise the complete circuit and apparatus may be identical to that shown in Fig. 1.

The rectifier 43 serves to prevent back flow of current from condenser 13 through inductance 11 to the power source. It will be recalled that the vibratory type current interrupter shown in Fig. 1 performed this same function because the connection between the condenser and the inductance was broken at the time the condenser attained its maximum charge, which is the time at which current would start to feed back.

Gas tube 44 has its plate connected in series with the primary coil of the transformer. Grid 45 of the tube is energized by the timing device 46, which is adapted to intermittently energize the grid to render the tube conductive. The timing device will energize the tube for extremely short periods of time at intervals of more than the time requirements for building up a maximum charge on condenser 13, but for a time interval of less than the time necessary for the condenser to completely discharge through the primary of the transformer, for, if the gas tube is energized for a longer period of time than is required for the discharge of condenser 13, current will flow, during this excess period of energization of grid 45, from inductance 11 through the primary coil of the transformer. This will reduce the efficiency of operation of the generator, as well as destroy the well regulated character of the out-put voltage delivered to the load circuit.

By proper adjustment of the timing device 46 to fix the frequency of energization of tube 44, rectifier 43 may be dispensed with. In order to do this, the frequency adjustment of device 46 must be such that tube 44 is periodically energized exactly at the time condenser 13 attains its maximum charge. In this instance also the time of each energization of tube 44 must be that which will only permit complete discharge of condenser 13. As a practical matter this time may be determined experimentally, but it has been found that any interval below $\frac{1}{10}$ of the natural period of the inductance-condenser circuit is satisfactory.

In the instance where the rectifier is dispensed with, proper selection of the gas tube 44 and correct biasing of grid 45, will provide automatic energization of the control tube. This is accomplished through voltage breakdown in the tube at the instant the condenser attains its maximum voltage. In order to start the above described operation, it is necessary to initially trigger the grid from an external signal.

While the modified circuit just discussed may be used with some degree of satisfaction, it is preferred to use the circuit illustrated in Fig. 1, because of its markedly higher efficiency, its reliability, small physical size and low cost. With regard to efficiency, it must be recalled that a voltage drop is encountered through both the gas discharge tube and the rectifier tube. This voltage drop is reflected in the output of the generator and together with the power requirements for the tube filament, signal device, etc., results in an overall efficiency drop of more than 20%.

Reliability and cost are related in the modified circuit. Due to the nature of the tubes and the associated control equipment, the cost of attaining reliable operation is relatively great as compared with Fig. 1 apparatus.

In addition reliable equipment for the modified circuit is impractical in most portable installations because of its large size and weight.

From the foregoing it will be seen that this invention is one well adapted to attain all of the ends and objects hereinabove set forth together with other advantages which are obvious and which are inherent to the structure.

It will be understood that certain features and sub-combinations are of utility and may be employed without reference to other features and subcombinations. This is contemplated by and is within the scope of the claims.

As many possible embodiments may be made of the invention without departing from the scope thereof, it is to be understod that all matter herein set forth or shown in the accompanying drawings is to be interpreted as illustrative and not in a limiting sense.

I claim:

1. An oscillatory surge generator comprising means providing a transformer with a primary coil and a secondary coil and an inductance providing a series reactance with one of the coils; a condenser; means adapted to be connected to an electric power source; means for alternately electrically connecting the condenser to the power connection means and simultaneously electrically disconnecting it from the primary coil circuit, and for connecting the condenser to the primary coil circuit and simultaneously electrically disconnecting it from the power connecting means, said alternating means operating periodically at a predetermined frequency; and a condenser across the secondary coil of the transformer; the primary coil having sufficient shunt reactance to insure a low frequency oscillation therethrough, the shunt reactance being sufficiently greater than the reactance of the inductance in series with the transformer to insure a high frequency surge oscillation through the condensers and this latter inductance relative to the frequency of the oscillation through the shunt reactance whereby energy discharged from the first condenser is nearly all utilized in the high frequency surge oscillation.

2. An oscillatory surge generator comprising a step up transformer having a primary coil and a secondary coil; a condenser; means adapted to be connected to an electric power source; means for alternately electrically connecting the condenser to the power connection means and simultaneously electrically disconnecting it from the primary coil circuit, and for connecting the condenser to the primary coil circuit and simultaneously electrically disconnecting it from the power connecting means, said alternating means operating periodically at a predetermined frequency; a condenser across the secondary coil of the transformer; and an inductance in series with one of the transformer coils; the primary coil having sufficient shunt reactance to insure a low frequency oscillation therethrough, the shunt reactance being sufficiently greater than the reactance of the inductance in series with the transformer to insure a high frequency surge oscillation through the condensers and this latter inductance relative to the frequency of the oscillation through the shunt reactance whereby energy discharged from the first condenser is nearly all utilized in the high frequency surge oscillation.

3. The generator of claim 2 wherein the means for alternately connecting the condenser to the power connection and the primary coil circuit includes a mechanical periodic switching means.

4. An oscillatory surge generator comprising a step up transformer having a primary coil and a secondary coil; a condenser; a source of D. C. current; connection means for establishing electric connections between the condenser and the D. C. source and for electrically disconnecting said condenser from the D. C. source; connection means for electrically connecting said condenser with the primary coil circuit and for electrically disconnecting said condenser therefrom; a timer and power means cooperable with both connection means to synchronize their operation to provide for alternate charging and discharging of the condenser at regular predetermined time intervals; a second condenser connected across the secondary coil; and an inductance in series with one of the transformer coils; the primary coil having sufficient shunt reactance to insure a low frequency oscillation therethrough, the shunt reactance being sufficiently greater than the reactance of the inductance in series with the transformer to insure a high frequency surge oscillation through the condensers and this latter inductance relative to the frequency of the oscillation through the shunt reactance whereby energy discharged from the first condenser is nearly all utilized in the high frequency surge oscillation.

5. A surge generator for efficiently developing high voltage oscillatory electric surges at predetermined regular intervals from a low voltage portable D. C. source comprising a converter means adapted when electrically energized to provide a low impedance D. C. potential; a voltage doubler circuit including an inductance and a condenser; means for periodically establishing electrical series connection between the low impedance D. C. converting means, the inductance, and the condenser, each such series connection when periodically completed being for a time interval sufficient to permit a maximum charge to accumulate upon the condenser and including means to prevent back flow of current in said series connection; means providing a transformer with a primary coil and a secondary coil and an inductance providing a series reactance with one of the coils; a second condenser connected across the secondary coil; means for intermittently establishing electrical connection between the first condenser, when charged, and the primary coil to discharge the condenser therethrough, said means electrically disconnecting said condenser from its series connection with the converter means; the two means for connecting the condenser with the converter means and the primary coil respectively being synchronized so as to alternate these two connections periodically at a predetermined rate; the primary coil having sufficient shunt reactance to insure a low frequency oscillation therethrough, the shunt reactance being sufficiently greater than the reactance of the inductance in series with the transformer to insure a high frequency surge oscillation through the condensers and this latter inductance relative to the frequency of the oscillation through the shunt reactance whereby energy discharged from the first condenser is nearly all utilized in the high frequency surge oscillation; the oscillatory surge being of short duration relative to the discharge connection interval for the first condenser.

6. A surge generator for efficiently developing high voltage oscillatory electric surges at predetermined regular intervals from a low voltage portable D. C. source comprising a converter means adapted when electrically energized to provide a low impedance D. C. potential; a voltage doubler circuit including an inductance and a condenser; means for periodically establishing electrical series connection between the low impedance D. C. converting means, the inductance, and the condenser, each such series connection when periodically completed being for a time interval sufficient to permit a maximum charge to accumulate upon the condenser and including means to prevent back flow of current in said series connection; a transformer having a primary and secondary coil; a second condenser connected across the secondary coil; means for intermittently establishing electrical connection between the first condenser, when charged, and the primary coil to discharge the condenser therethrough, said means electrically disconnecting said condenser from its series connection with the converter means; an inductance in series with one of the transformer coils; the two means for connecting the condenser with the converter means and the primary coil respectively being synchronized so as to alternate these two connections periodically at a predetermined rate; the primary coil having sufficient shunt reactance to insure a low frequency oscillation therethrough, the shunt reactance being sufficiently greater than the reactance of the inductance in series with the transformer to insure a high frequency surge oscillation through the condensers and this latter inductance relative to the frequency of the oscillation through the shunt reactance whereby energy discharged from the first condenser is nearly all utilized in the high frequency surge oscillation; the oscillatory surge being of short duration relative to the discharge connection interval for the first condenser.

7. A surge generator for efficiently developing high voltage oscillatory electric surges at predetermined regular intervals from a low voltage portable D. C. source comprising a battery; means connected to the battery for converting the battery power to a higher, low impedance D. C. potential; a voltage doubler circuit including an inductance and a condenser; means for periodically establishing electrical series connection between the low impedance D. C. converting means, the inductance, and the condenser, each such series connection when periodically completed being for a time interval sufficient to permit a maximum charge to accumulate upon the condenser and including means to prevent back flow of current in said series connection; a transformer having a primary and secondary coil; a second condenser connected across the secondary coil; means for intermittently establishing electrical connection between the first condenser, when charged, and the primary coil to discharge the condenser therethrough, said means electrically disconnecting said condenser from its series connection with the converter means; an inductance in series with one of the transformer coils; the two means for connecting the condenser with the converter means and the primary coil respectively being synchronized so as to alternate these two connections periodically at a predetermined rate; the primary coil having sufficient shunt reactance to insure a low frequency oscillation therethrough, the shunt reactance being sufficiently greater than the reactance of the inductance in series with the transformer to insure a high frequency surge oscillation through the condensers and this latter inductance relative to the frequency of the oscillation through the shunt reactance whereby energy discharged from the first condenser is nearly all utilized in the high frequency surge oscillation; the oscillatory surge being of short duration relative to the discharge connection interval for the first condenser.

8. A surge generator as in claim 7 wherein the periodic means for establishing the connections for alternately charging and discharging the condenser includes a mechanical alternating switching means.

DICK E. STEARNS.

REFERENCES CITED

The following references are of record in the file of this patent:

UNITED STATES PATENTS

| Number | Name | Date |
|---|---|---|
| 1,561,483 | Pickard | Nov. 17, 1925 |
| 1,950,484 | Clarvoe | Mar. 13, 1934 |
| 2,043,528 | Davis | June 9, 1936 |
| 2,105,675 | Sproule | Jan. 18, 1938 |
| 2,237,003 | Kiltie | Apr. 1, 1941 |
| 2,239,786 | Jones | Apr. 29, 1941 |
| 2,265,224 | Burton | Dec. 9, 1941 |
| 2,265,717 | Bedford | Dec. 9, 1941 |
| 2,267,260 | Alexander | Dec. 23, 1941 |
| 2,291,069 | Brown | July 28, 1942 |
| 2,322,597 | Short | June 22, 1943 |
| 2,338,080 | Brown | Dec. 28, 1943 |
| 2,352,299 | Walker | June 27, 1944 |
| 2,483,915 | Lines | Oct. 4, 1949 |